United States Patent
Liu

(10) Patent No.: US 9,601,244 B2
(45) Date of Patent: Mar. 21, 2017

(54) ZINC OXIDE BASED VARISTOR AND FABRICATION METHOD

(71) Applicant: LITTELFUSE, INC., Chicago, IL (US)

(72) Inventor: Shuying Liu, Guangdong (CN)

(73) Assignee: Littelfuse, Inc., Chicago, IL (US)

( * ) Notice: Subject to any disclaimer, the term of this patent is extended or adjusted under 35 U.S.C. 154(b) by 9 days.

(21) Appl. No.: 14/443,137

(22) PCT Filed: Dec. 27, 2012

(86) PCT No.: PCT/CN2012/087605
§ 371 (c)(1),
(2) Date: May 15, 2015

(87) PCT Pub. No.: WO2014/101030
PCT Pub. Date: Jul. 3, 2014

(65) Prior Publication Data
US 2015/0294769 A1    Oct. 15, 2015

(51) Int. Cl.
*H01C 7/10*  (2006.01)
*H01C 7/12*  (2006.01)
(Continued)

(52) U.S. Cl.
CPC ............ *H01C 7/12* (2013.01); *C04B 35/453* (2013.01); *C04B 35/62655* (2013.01);
(Continued)

(58) Field of Classification Search
CPC .......... H01C 7/12; H01C 7/112; H01C 17/00; H01C 7/108
(Continued)

(56) References Cited

U.S. PATENT DOCUMENTS 5,277,843 A * 1/1994 Imai ................. H01C 7/112
                                                  252/519.52
5,973,588 A * 10/1999 Cowman ........... H01C 7/1006
                                                  338/21
(Continued)

FOREIGN PATENT DOCUMENTS

CN    1844043 A    10/2006
CN    1844044 A    10/2006
(Continued)

OTHER PUBLICATIONS

Li et al., CN 1844044A, Machine translation, Apr. 24, 2006.*

*Primary Examiner* — Kyung Lee

(57) ABSTRACT

A varistor may include a varistor ceramic that includes zinc oxide having a molar percent greater than 90 percent and a set of metal oxides, where the set of metal oxides includes $Bi_2O_3$ having a molar fraction between 0.2 and 2.5 percent; $Co_3O_4$ having a molar fraction between 0.2 and 1.2 percent; $Mn_3O_4$ having a molar fraction between 0.05 and 0.5 percent; $Cr_2O_3$ having a molar fraction between 0.05 and 0.5 percent; NiO having a molar fraction between 0.5 and 1.5 percent; $Sb_2O_3$ oxide having a molar fraction between 0.05 and 1.5 percent; $B_2O_3$ having a molar fraction between 0.001 to 0.03 percent; and aluminum in the form of an oxide having a molar fraction between 0.001 and 0.05 percent.

12 Claims, 8 Drawing Sheets

| L150A | | L100S | | L20G | |
|---|---|---|---|---|---|
| Elements | mol% | Elements | mol% | Elements | mol% |
| Zn | 93.5236 | Zn | 94.2740 | Zn | 94.5588 |
| Bi | 0.9878 | Bi | 2.1934 | Bi | 1.8078 |
| Co | 0.9617 | Co | 1.1138 | Co | 1.5218 |
| Mn | 0.8708 | Mn | 0.5040 | Mn | 0.2032 |
| Cr | 0.2186 | Cr | 0.2191 | Cr | 0.2787 |
| Ni | 1.1137 | Ni | 0.7833 | Ni | 0.7285 |
| B | 0.0198 | B | 0.0198 | B | 0.0198 |
| Sb | 2.3231 | Sb | 0.8898 | Sb | 0.2138 |
| Al | 0.0031 | Al | 0.0032 | Al | 0.0051 |
| | | | | Ti | 0.5619 |
| | | | | Ba | 0.0128 |

(51) Int. Cl.
C04B 35/453 (2006.01)
H01C 7/108 (2006.01)
H01C 7/112 (2006.01)
C04B 35/626 (2006.01)
C04B 35/638 (2006.01)
H01C 17/00 (2006.01)

(52) U.S. Cl.
CPC ........... *C04B 35/638* (2013.01); *H01C 7/108* (2013.01); *H01C 7/112* (2013.01); *H01C 17/00* (2013.01); *C04B 2235/3217* (2013.01); *C04B 2235/3241* (2013.01); *C04B 2235/3263* (2013.01); *C04B 2235/3277* (2013.01); *C04B 2235/3279* (2013.01); *C04B 2235/3284* (2013.01); *C04B 2235/3294* (2013.01); *C04B 2235/3298* (2013.01); *C04B 2235/3409* (2013.01); *C04B 2235/6567* (2013.01)

(58) Field of Classification Search
USPC ....................................................... 338/21, 13
See application file for complete search history.

(56) References Cited

U.S. PATENT DOCUMENTS

| 6,334,964 | B1 * | 1/2002 | Cowman | H01C 7/1006 106/1.16 |
| 6,743,381 | B2 * | 6/2004 | Cowman | H01C 7/1006 252/500 |
| 8,217,751 | B2 * | 7/2012 | Tan | B32B 18/00 252/519.51 |
| 2002/0024040 | A1 * | 2/2002 | Cowman | H01C 7/1006 252/500 |

FOREIGN PATENT DOCUMENTS

| CN | 1844045 A | 10/2006 |
| CN | 1962539 A | 5/2007 |
| CN | 101096309 A | 1/2008 |
| JP | S56076504 A | 6/1981 |
| JP | S60060702 A | 4/1985 |
| JP | S61170005 A | 7/1986 |
| JP | H08031615 A | 2/1996 |
| JP | H08067555 A | 3/1996 |

* cited by examiner

FIG. 4A

| L150A | | L100S | | L20G | |
|---|---|---|---|---|---|
| raw materials | mol% | raw materials | mol% | raw materials | mol% |
| ZnO | 96.4014 | ZnO | 96.9293 | ZnO | 96.8532 |
| Bi2O3 | 0.4988 | Bi2O3 | 1.1276 | Bi2O3 | 0.9259 |
| Co3O4 | 0.3304 | Co3O4 | 0.3817 | Co3O4 | 0.5196 |
| Mn3O4 | 0.2992 | Mn3O4 | 0.1727 | Mn3O4 | 0.1001 |
| Cr2O3 | 0.1116 | Cr2O3 | 0.1126 | Cr2O3 | 0.1417 |
| NiO | 1.1479 | NiO | 0.8054 | NiO | 0.7461 |
| B2O3 | 0.0101 | B2O3 | 0.0101 | B2O3 | 0.0100 |
| Sb2O3 | 1.1973 | Sb2O3 | 0.4573 | Sb2O3 | 0.1095 |
| Al(NO3)3·9H2O | 0.0032 | Al(NO3)3·9H2O | 0.0033 | Al(NO3)3·9H2O | 0.0052 |
| | | | | TiO2 | 0.5755 |
| | | | | Ba(CH3COO)2 | 0.0131 |

FIG. 4B

| L150A | | L100S | | L20G | |
|---|---|---|---|---|---|
| Elements | mol% | Elements | mol% | Elements | mol% |
| Zn | 93.5236 | Zn | 94.2740 | Zn | 94.5688 |
| Bi | 0.9678 | Bi | 2.1934 | Bi | 1.8078 |
| Co | 0.9617 | Co | 1.1138 | Co | 1.5218 |
| Mn | 0.8708 | Mn | 0.5040 | Mn | 0.2932 |
| Cr | 0.2166 | Cr | 0.2191 | Cr | 0.2787 |
| Ni | 1.1137 | Ni | 0.7833 | Ni | 0.7285 |
| B | 0.0196 | B | 0.0196 | B | 0.0196 |
| Sb | 2.3231 | Sb | 0.8896 | Sb | 0.2138 |
| Al | 0.0031 | Al | 0.0032 | Al | 0.0051 |
| | | | | Ti | 0.5619 |
| | | | | Ba | 0.0128 |

| element | Co | Mn | Ni | Cr | Ti | Bi | Sb | Al |
|---|---|---|---|---|---|---|---|---|
| in mol | 1.00% | 0.25% | 0.70% | 0.20% | 0.50% | 0.80% | 0.10% | 0.004% |

FIG. 5A

| | additional composition (elements in mol%) | | | | | | | varistor voltage (V/mm) | surge cap (8/20us) (A) | current density (A/mm²) |
|---|---|---|---|---|---|---|---|---|---|---|
| No | Co | Mn | Ni | Cr | Ti | Bi | Sb | | | |
| 1 | | 0.04% | 0.03% | 0.08% | 0.30% | 0.91% | 0.11% | 32.7 | 5000 | 41.4 |
| 2 | | 0.04% | 0.03% | 0.08% | 0.30% | 0.91% | 0.11% | 34.0 | 7000 | 58 |
| 3 | | 0.04% | 0.03% | 0.08% | 0.30% | 0.91% | 0.11% | 34.7 | 5000 | 41.4 |
| 4 | 0.52% | | 0.03% | 0.08% | 0.30% | 0.91% | 0.11% | 32.7 | 5000 | 41.4 |
| 5 | 0.52% | | 0.03% | 0.08% | 0.30% | 0.91% | 0.11% | 34.0 | 7000 | 58 |
| 6 | 0.52% | | 0.03% | 0.08% | 0.30% | 0.91% | 0.11% | 34.7 | 5000 | 41.4 |
| 7 | 0.52% | 0.04% | | 0.08% | 0.30% | 0.91% | 0.11% | 32.7 | 5000 | 41.4 |
| 8 | 0.52% | 0.04% | | 0.08% | 0.30% | 0.91% | 0.11% | 33.4 | 7000 | 58 |
| 9 | 0.52% | 0.04% | | 0.08% | 0.30% | 0.91% | 0.11% | 35.2 | 7000 | 58 |
| 10 | 0.52% | 0.04% | 0.03% | | 0.30% | 0.91% | 0.11% | 34.4 | 6000 | 49.7 |
| 11 | 0.52% | 0.04% | 0.03% | | 0.30% | 0.91% | 0.11% | 32.7 | 5000 | 41.4 |
| 12 | 0.52% | 0.04% | 0.03% | | 0.30% | 0.91% | 0.11% | 35.1 | 6000 | 49.7 |
| 13 | 0.52% | 0.04% | 0.03% | 0.08% | | 0.91% | 0.11% | 29.9 | 7000 | 58 |
| 14 | 0.52% | 0.04% | 0.03% | 0.08% | | 0.91% | 0.11% | 30.2 | 7000 | 58 |
| 15 | 0.52% | 0.04% | 0.03% | 0.08% | | 0.91% | 0.11% | 35.7 | 7000 | 58 |
| 16 | 0.52% | 0.04% | 0.03% | 0.08% | 0.30% | | 0.11% | 29.0 | 5000 | 41.4 |
| 17 | 0.52% | 0.04% | 0.03% | 0.08% | 0.30% | | 0.11% | 35.8 | 5000 | 41.4 |
| 18 | 0.52% | 0.04% | 0.03% | 0.08% | 0.30% | | 0.11% | 27.4 | 2500 | 20.7 |
| 19 | 0.52% | 0.04% | 0.03% | 0.08% | 0.30% | 0.91% | | 41.3 | 5000 | 41.4 |
| 20 | 0.52% | 0.04% | 0.03% | 0.08% | 0.30% | 0.91% | | 36.9 | 5000 | 41.4 |
| 21 | 0.52% | 0.04% | 0.03% | 0.08% | 0.30% | 0.91% | | 32.6 | 5000 | 41.4 |

FIG. 5B

| element | Co | Mn | Ni | Cr | Bi | Sb | Al |
|---|---|---|---|---|---|---|---|
| in mol | 0.80% | 0.20% | 0.40% | 0.20% | 2.00% | 0.89% | 0.002% |

FIG. 5C

| No | additional composition (elements in mol%) | | | | | varistor voltage (V/mm) | surge cap. (8/20us) (A) | current density (A/mm²) |
|---|---|---|---|---|---|---|---|---|
| | Co | Mn | Ni | Al | Bi | | | |
| 1 | ▨ | 0.30% | 0.73% | 0.001% | 0.19% | 115 | 6000 | 49.7 |
| 2 | ▨ | 0.30% | 0.73% | 0.001% | 0.19% | 120 | 7000 | 58 |
| 3 | ▨ | 0.30% | 0.73% | 0.001% | 0.19% | 126 | 7000 | 58 |
| 4 | 0.31% | ▨ | 0.73% | 0.001% | 0.19% | 112 | 7000 | 58 |
| 5 | 0.31% | ▨ | 0.73% | 0.001% | 0.19% | 115 | 7000 | 58 |
| 6 | 0.31% | ▨ | 0.73% | 0.001% | 0.19% | 131 | 7000 | 58 |
| 7 | 0.31% | 0.30% | ▨ | 0.001% | 0.19% | 115 | 6000 | 49.7 |
| 8 | 0.31% | 0.30% | ▨ | 0.001% | 0.19% | 123 | 8000 | 66.3 |
| 9 | 0.31% | 0.30% | ▨ | 0.001% | 0.19% | 128 | 8000 | 66.3 |
| 10 | 0.31% | 0.30% | 0.38% | ▨ | 0.19% | 111 | 7000 | 58 |
| 11 | 0.31% | 0.30% | 0.38% | ▨ | 0.19% | 118 | 7000 | 58 |
| 12 | 0.31% | 0.30% | 0.38% | ▨ | 0.19% | 125 | 7000 | 58 |
| 13 | 0.31% | 0.30% | 0.73% | 0.0003% | ▨ | 119 | 7000 | 58 |
| 14 | 0.31% | 0.30% | 0.73% | 0.0003% | ▨ | 117 | 7000 | 58 |
| 15 | 0.31% | 0.30% | 0.73% | 0.0003% | ▨ | 118 | 8000 | 66.3 |

FIG. 5D

| Components Diameter (mm) | Voltage | | Conventional MOV | | present invention L20 | |
|---|---|---|---|---|---|---|
| | $V_{RMS}$ (V) | $V_n$ (V) | $I_{max}$ (8/20)(A) | $W_{max}$ (2ms)(J) | $I_{max}$ (8/20)(A) | $W_{max}$ (2ms)(J) |
| 5 | 14 | 22 | 100 | 0.4 | 720 | 9.4 |
| 7 | 17 | 27 | 250 | 1.1 | 1450 | 22 |
| 10 | 25 | 39 | 500 | 3.7 | 2800 | 50 |
| 14 | 30 | 47 | 1000 | 9 | 4500 | 130 |
| 20 | 40 | 68 | 2000 | 37 | 9500 | 320 |

| Powder | varistor voltage (V/mm) | Product type | disc size area (mm) | Vn+ (V) | Vn- (V) | Ipk (A) | Vc (V) | Vn+ (V) | Vn- (V) | ΔVn/Vn (+) | ΔVn/Vn (-) | V10kA/ V1mA | V10kA/ V1mA |
|---|---|---|---|---|---|---|---|---|---|---|---|---|---|
| L20G | 28 | V20E40 | φ20 | 68.47 | 68.66 | 10.40 | 717.6 | 63.78 | 65.65 | -6.85% | -4.38% | 10.5 | 10.6 |
| | | | | 67.87 | 68.01 | 10.44 | 718.0 | 62.05 | 64.52 | -8.58% | -5.13% | 10.6 | |
| | | | | 66.76 | 66.92 | 10.43 | 721.1 | 61.41 | 63.95 | -8.01% | -4.44% | 10.8 | |
| | | | | 67.97 | 68.08 | 10.44 | 722.9 | 62.34 | 64.73 | -8.28% | -4.92% | 10.6 | |
| | | | | 64.84 | 65.17 | 10.40 | 686.8 | 60.31 | 62.46 | -6.99% | -4.16% | 10.6 | |
| L20G | 28 | 34S040 | 34*34 | 65.48 | 65.73 | 10.17 | 581.2 | 65.69 | 65.41 | 0.32% | -0.49% | 8.9 | 8.9 |
| | | | | 66.36 | 66.61 | 10.19 | 571.4 | 66.61 | 66.22 | 0.38% | -0.59% | 8.6 | |
| | | | | 65.53 | 65.81 | 10.20 | 565.2 | 65.66 | 65.33 | 0.20% | -0.73% | 8.6 | |
| | | | | 64.43 | 64.47 | 10.15 | 583.0 | 64.47 | 64.32 | 0.06% | -0.23% | 9.0 | |
| | | | | 65.05 | 65.11 | 10.16 | 591.5 | 65.08 | 64.94 | 0.05% | -0.26% | 9.1 | |
| L150A | 150 | V20E150 | φ20 | 238.5 | 240.2 | 10.10 | 1080.0 | 238.8 | 242.9 | 0.13% | 1.12% | 4.5 | 4.5 |
| | | | | 244.5 | 245.9 | 10.06 | 1090.0 | 242.5 | 248.5 | -0.82% | 1.06% | 4.5 | |
| | | | | 249.2 | 250.3 | 10.02 | 1120.0 | 246.4 | 253.2 | -1.12% | 1.16% | 4.5 | |
| | | | | 239.4 | 241.4 | 10.05 | 1100.0 | 238.2 | 243.5 | -0.50% | 0.87% | 4.6 | |
| | | | | 236.4 | 237.6 | 10.10 | 1050.0 | 233.8 | 240.5 | -1.10% | 1.22% | 4.4 | |
| L150A | 150 | 34S320 | 34*34 | 499.0 | 504.0 | 9.85 | 1390.0 | 499.0 | 505.0 | 0.00% | 0.20% | 2.8 | 2.8 |
| | | | | 520.0 | 525.0 | 9.94 | 1430.0 | 516.0 | 526.0 | -0.77% | 0.19% | 2.8 | |
| | | | | 523.0 | 528.0 | 9.98 | 1430.0 | 524.0 | 529.0 | 0.19% | 0.19% | 2.7 | |
| L100S | 100 | 34S320 | 34*34 | 473 | 475 | 10.01 | 1350.0 | 474 | 479 | 0.21% | 0.84% | 2.9 | 2.9 |
| | | | | 463 | 466 | 9.99 | 1340.0 | 461 | 467 | -0.43% | 0.43% | 2.9 | |
| | | | | 469 | 472 | 10.02 | 1340.0 | 468 | 474 | -0.21% | 0.42% | 2.9 | |
| | | | | 465 | 467 | 10.01 | 1350.0 | 464 | 469 | -0.22% | 0.43% | 2.9 | |
| | | | | 464 | 466 | 10.01 | 1340.0 | 463 | 469 | -0.22% | 0.64% | 2.9 | |

ZINC OXIDE BASED VARISTOR AND FABRICATION METHOD

BACKGROUND OF THE INVENTION

Field of the Invention

Embodiments of the invention relate to the field of circuit protection devices. More particularly, the present invention relates to a metal oxide varistor for surge protection.

Discussion of Related Art

Over-voltage protection devices are used to protect electronic circuits and components from damage due to over-voltage fault conditions. These over-voltage protection devices may include metal oxide varistors (MOVs) that are connected between the circuits to be protected and a ground line. MOVs have a unique current-voltage characteristic that allows them to be used to protect such circuits against catastrophic voltage surges. However, because varistor devices are so widely deployed to protect many different type of apparatus, there is a continuing need to improve properties of varistors. For example, it may be desirable to improve operational life and/or performance under high energy surge events. One parameter affecting varistor life expectancy is its energy (Joule) rating. As the energy rating increases, the varistor life expectancy typically increases exponentially, the number of transient pulses that it can accommodate increases and the "clamping voltage" provided during each transient decreases. For protection against high energy pulses improvements in varistor performance may also be desirable. For example, if a very large surge such as a lightning strike occurs, the energy dissipated may exceed that which the varistor can accommodate. Follow-through current as a result of a strike may generate excessive current that completely destroys the varistor. Accordingly, it will be appreciated that improvements are desirable in present day circuit protection device employing metal oxide varistors.

SUMMARY OF THE INVENTION

Exemplary embodiments of the present invention are directed to a circuit protection device. In an exemplary embodiment, a varistor may include a varistor ceramic that includes zinc oxide having a molar percent greater than 90 percent; a set of metal oxides. The set of metal oxides may include: bismuth in oxide form comprising a molar fraction equivalent to between 0.2 and 2.5 percent $Bi_2O_3$; cobalt in oxide form comprising a molar fraction equivalent to between 0.2 and 1.2 percent $Co_3O_4$; manganese in oxide form comprising a molar fraction equivalent to between 0.05 and 0.5 percent $Mn_3O_4$; chromium in oxide form comprising a molar fraction equivalent to between 0.05 and 0.5 percent $Cr_2O_3$; nickel in oxide form comprising a molar fraction equivalent to between 0.5 and 1.5 percent NiO; antimony in oxide form comprising a molar fraction equivalent to between 0.05 and 1.5 percent $Sb_2O_3$; boron in oxide form comprising a having a molar fraction equivalent to 0.001 to 0.05 percent $B_2O_3$; and aluminum in $Al^{3+}$ from comprising a molar fraction equivalent to between 0.001 and 0.05 percent.

BRIEF DESCRIPTION OF THE DRAWINGS

FIG. 4A presents an exemplary set of compositions for components of three different formulations.
FIG. 4B presents another expression of component compositions for the formulations of FIG. 4A.
FIG. 5A presents a base composition for a first powder formulation used in a series of experiments.
FIG. 5B presents compositional variations to the base composition of FIG. 5A used to synthesize varistor samples and resulting varistor electrical properties.
FIG. 5C presents a base composition for a second powder formulation used in a series of experiments.
FIG. 5D presents compositional variations to the base composition of FIG. 5C used to synthesize varistor samples and resulting varistor electrical properties.
FIG. 8 depicts experimental measurements of the electrical performance of high voltage varistors synthesized according to the L150 formulation, also depicts experimental measurements of the electrical performance of varistors synthesized using the intermediate voltage L100 formulation, also depicts experimental measurements of the electrical performance of varistors synthesized using the low voltage L20 formulation.

DESCRIPTION OF EMBODIMENTS

Figure 1:
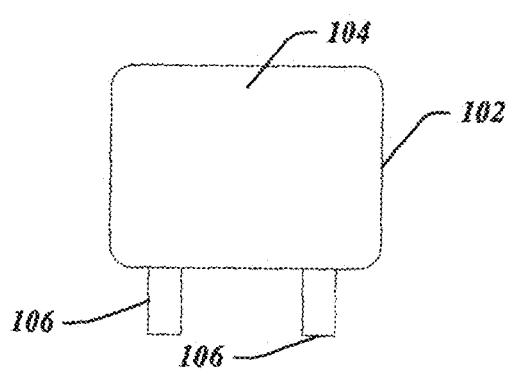
FIG. 1 depicts an exemplary varistor.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

In the following description and/or claims, the terms "on," "overlying," "disposed on" and "over" may be used in the following description and claims. "On," "overlying," "disposed on" and "over" may be used to indicate that two or more elements are in direct physical contact with each other. However, "on,", "overlying," "disposed on," and over, may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

The present embodiments are generally related to metal oxide varistors (MOV) based upon zinc oxide materials. As is known, a varistor of this type comprises a ceramic body whose microstructure includes zinc oxide grains and may include various other components such as other metal oxides that are disposed within the ceramic microstructure. Properties of such ceramic zinc oxide varistors may in general vary depending upon the exact composition and microstructure of the varistor. By the way of background, MOVs are primarily comprised of zinc oxide granules that are sintered together to form a disc where the zinc oxide granule, as a solid, is a highly conductive material, while the intergranular boundary formed of other oxides is highly resistive. Only at those points where zinc oxide granules meet does sintering produce a 'microvaristor' which is comparable to symmetrical Zener diodes. The electrical behavior of a metal oxide varistor results from the number of microvaristors connected in series or in parallel. The sintered body of an MOV also explains its high electrical load capacity which permits high absorption of energy and thus, exceptionally high surge current handling capability.

In particular, in various known MOV devices the boundary between crystallites (grains) of the ceramic may form a diode junction, which allows current to flow only in one direction. After sintering, an assemblage of grains within the microstructure of the ceramic MOV may be modeled as a network of back to back diode pairs where each pair is arranged in parallel to many other diode pairs. When a small or moderate voltage is applied across the electrodes, only a tiny current flows caused by reverse leakage through the diode junctions. When a large voltage is applied, the diode junction breaks down due to a combination of thermionic emission and electron tunneling and a large current flows. The result of this behavior is a highly nonlinear current-voltage characteristic, in which the MOV has a high resistance at low voltages and a low resistance at high voltages.

Extensive efforts have heretofore taken place to improve the properties of known MOV devices, especially Zinc oxide based varistors. Consistent with the present embodiments a set of novel and non-obvious materials MOV ceramics are disclosed based upon Zinc oxide. In particular, the present inventor has discovered a novel set of compositions that yields unexpectedly superior varistor device performance properties as detailed below. A set of methods for forming such enhanced varistor devices is also disclosed.

Figure 2:
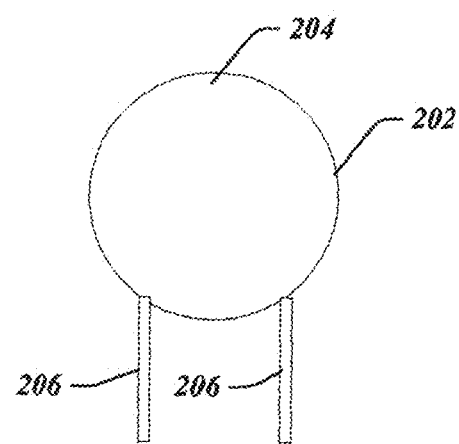
FIG. 2 depicts another exemplary varistor.

FIG. 1 depicts one varistor 102 and FIG. 2 another varistor 202 that each may be fabricated with enhanced properties as detailed below. In particular, the varistor body 104, 204 may be fabricated with a novel composition that imparts unexpectedly improved electrical performance to varistors 102, 202. The varistors 102, 202 each depict a varistor type having a pair of respective leads. 106, 206. However, in the present embodiments a varistor may be fabricated with any convenient shape, size, and lead structure, as will be apparent to those of skill in the art.

Figure 3:
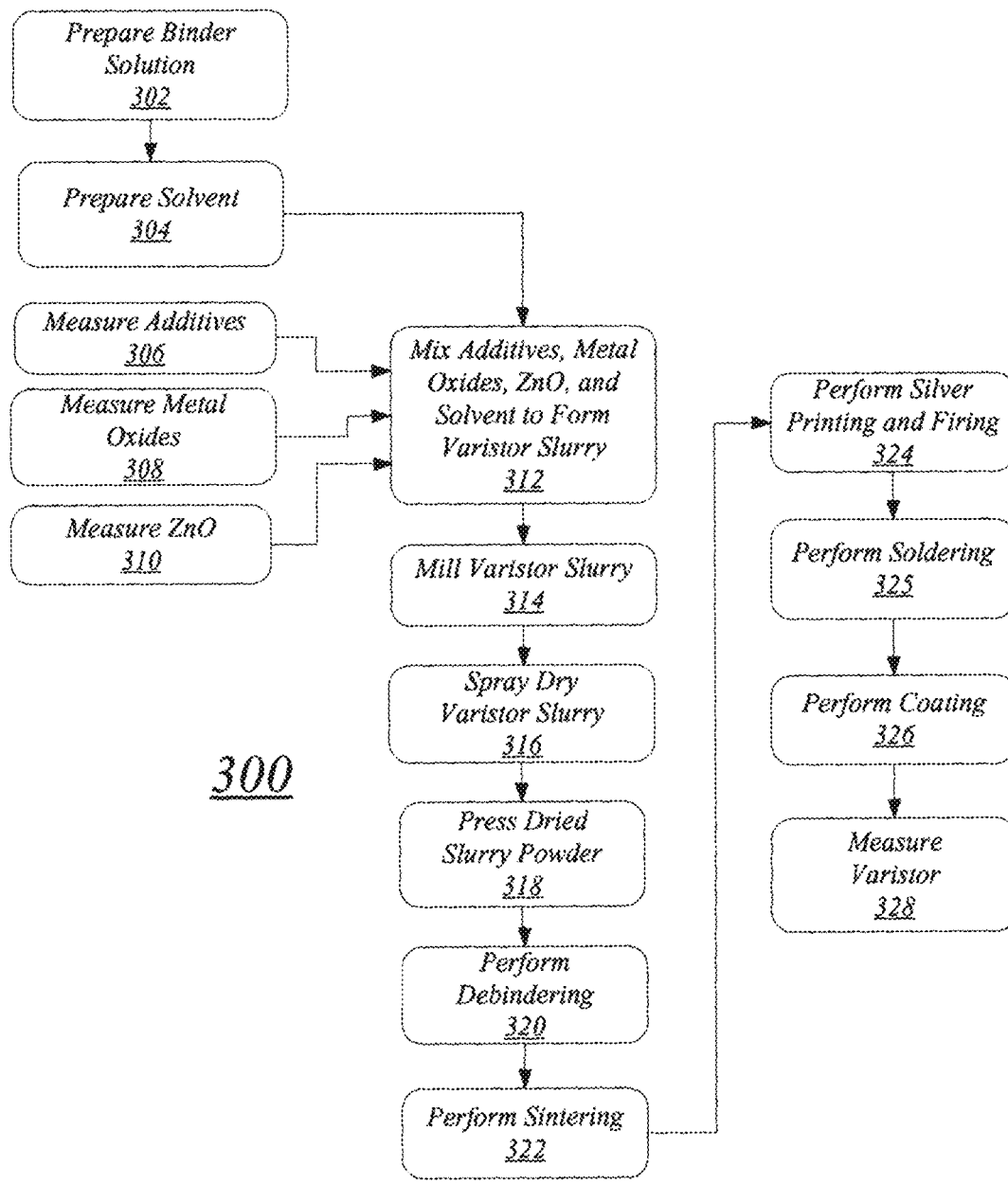
FIG. 3 illustrates an exemplary process flow.

FIG. 3 illustrates an exemplary process 300 for forming an enhanced varistor consistent with the present embodiments. The process 300 may be used to fabricate Zinc oxide based varistors having enhanced properties as detailed below. At block 302 a binder solution is prepared. The binder solution is used to create a binder to be used in processing varistor material into a varistor body or perform. In various embodiments, the binder solution may be prepared using a polymer material that is dissolved in water at elevated temperatures. In one example, the binder is prepared from polyvinyl alcohol (PVA), and in particular, a solution of 10 weight percent PVA in deionized water. The solution may be prepared by stirring of the PVA water mixture at elevated temperature. In one example, the solution is stirred at a temperature of about 90 C for about 2 hours.

As further shown in FIG. 3, at block 304 a solvent is prepared. The solvent is prepared by adding the PVA solution prepared in block 302 to a mixture of water and other components. The solvent may contain one or more dispersion agents, a defoaming agent, other binding agents, and other additives, such as an additive to adjust pH. Consistent with the present embodiments, the solvent may be prepared by stirring the above ingredients in a convenient container such as a plastic container.

At blocks 306 to 310 various components to form the enhanced varistor are measured for adding to the solvent. For example, at block 306 various additives are added to the solvent such as additives containing Al, B, or alkaline earth metals. These additives are typically incorporated as trace components in the final varistor to be formed.

At block 308, a set of metal oxides are measured for adding to the solvent. The metal oxides may include, for example, $Bi_2O_3$, $Co_3O_4$, $Mn_3O_4$, $Cr_2O_3$, NiO, and $Sb_2O_3$. These components are typically incorporated as minor components in the final varistor, such that each metal oxide may comprise a molar percent on the order of about 0.1 percent to about 3 percent. Exemplary compositional ranges for varistors formed in accordance with the present embodiments for the above metal oxide components include: bismuth in oxide form comprising a molar fraction equivalent to between 0.2 and 2.5 percent $Bi_2O_3$; cobalt in oxide form comprising a molar fraction equivalent to between 0.2 and 1.2 percent $Co_3O_4$; manganese in oxide form comprising a molar fraction equivalent to between 0.05 and 0.5 percent $Mn_3O_4$; chromium in oxide form comprising a molar fraction equivalent to between 0.05 and 0.5 percent $Cr_2O_3$; nickel in oxide form comprising a molar fraction equivalent to between 0.5 and 1.5 percent NiO; antimony in oxide form comprising a molar fraction equivalent to between 0.05 and 1.5 percent $Sb_2O_3$; boron in oxide form having a molar fraction equivalent to 0.001 to 0.05 percent $B_2O_3$; and aluminum in $Al^{3+}$ from comprising a molar fraction equivalent to between 0.001 and 0.05 percent. In some variants titanium may be included in the varistor powder in oxide form comprising a molar fraction equivalent to between 0.2 and 1.0 percent $TiO_2$. By adjusting the exact composition of metal oxide components the varistor performance may be enhanced substantially.

FIGS. 4A and 4B depicts exemplary oxide component compositions for three different specific formulations, termed "L20G," "L100S," and "L150A." The L20G formulations are targeted for preparation of low voltage varistors, the L100S targeted to medium voltage varistors, and L150A targeted to high voltage varistors. In FIG. 4A, the molar fraction of the various components for each of the L20G, L100S, and L150A formulations is shown as a function of a raw material used such as the stochiometric oxide "$Bi_2O_3$" in the case of bismuth. For convenience, in FIG. 4B, the molar fraction of the various oxide components for each of the L20G, L100S, and L150A composition is shown as a function of the molar fraction of the metal component of the oxide, such as "Bi" in the case of bismuth. As evident from FIGS. 4A and 4B, the molar fraction of components of the varistors may differ when expressed as a metal (FIG. 4B) as opposed to the stochiometric compound containing that metal (FIG. 4A).

Notably, the compositions listed for the L20G, L100S, and L150A formulations are merely exemplary, and the molar fraction of one or more of the oxide components may be varied to tune electrical properties of a varistor powder as described below. Moreover, although FIG. 4B lists the molar fraction of the metallic element that forms an oxide component, each metallic element is incorporated as an oxide in the varistor material as will be appreciated by those of skill in the art.

At block 310 ZnO (zinc oxide) is measured in order to provide the appropriate weight fraction in the final varistor to be formed. Consistent with some embodiments and detailed below, the molar fraction of ZnO may be about 90 to 99 percent.

At block 312 the additives, metal oxides, zinc oxide, and solvent are mixed together to form a varistor slurry. In some embodiments, these components may be introduced in a predetermined order. For example, the additives may be added to the solvent in a stirring container, followed by the introduction of the metal oxides into the stirring container. Finally, the ZnO may be added to the stirring container.

At block 314 the varistor slurry is milled. In one example ball milling may take place for ten to twenty hours.

At block 316, the varistor slurry is spray dried thereby forming a granule. At block 318, the varistor granule is pressed to form a desired solid object. At block 320, debindering is performed. In this step the pressed powder in the form of a solid object such as a disc is placed in an apparatus such as an oven for heating in order to remove binder material from the pressed powder. In some examples the maximum temperature for heating the pressed powder during the debindering process is between 400° C. and 700° C. The process time may range from about 10 to 40 hours in some examples.

At block 322, sintering of the pressed powder is performed after the debindering. The pressed powder solid object may be sintered in a kiln at a temperature in the range of 1000° C. to 1300° C. in some embodiments. The sintering time may be about 10 to 30 hours. Subsequently, silver printing firing (block 324), soldering (block 325), and coating (block 326) may be performed to prepare the varistor so that measurements may be performed (block 328).

As noted previously, the present inventor has identified specific ranges of composition of ZnO based varistors in which the device performance is unexpectedly substantially enhanced. Although different components of the varistor materials which contain oxide of Co, Mn, Ni, Cr, Bi and Sb are known, specific combinations of components in specific compositional ranges have been found to substantially enhance desirable electrical properties of ZnO varistors, such as maximum surge current capability, resistance to degradation.

In several sets of experiments composition of various components of a ZnO varistor was varied and electrical performance measured. FIGS. 5A and 5B depicts a summary of different components used to prepare varistor samples according to a first set of materials, as well as results of electrical measurements. Data shown in FIG. 5A and FIG. 5B represent a group of low voltage L20 varistor formulations which varistor voltages vary from about 20V/mm to 40V/mm. In particular, FIG. 5A illustrates a base powder composition (L20BC), where the composition of specified components refers to the molar fraction of the metal for various metal oxide components as in FIG. 4B. FIG. 5B illustrates various additional amounts of material (denoted L20AC) that were added to the L20BC formulations to arrive at the final varistor compositions (L20) whose electrical properties were measured and shown in FIG. 5B. The actual varistor compositions are not shown in FIG. 5B, but merely the additional amounts of each individual component with respect to its base value shown in FIG. 5A. Thus, for example an entry in FIG. 5B that lists a nickel composition of 0.15% refers to a varistor powder whose nickel molar fraction (albeit incorporated in the varistor in oxide form) is 0.85% (=0.70% base composition given in FIG. 5A+0.15 added molar fraction shown in FIG. 5B).

In particular, powder compositions were prepared by adjusting the base composition shown in FIG. 4A by adding 0.1~0.52 mol % cobalt (in oxide form), 0.04~0.45 mol % manganese (in oxide form), 0.03~0.15 mol % nickel (in oxide form), 0.02~0.14 mol % chromium (in oxide form), 0.06~0.38 mol % titanium (in oxide form), 0.05~1.28 mol % bismuth (in oxide form), 0.01~0.16 mol % antimony (in oxide form). The above materials, which, in addition to ZnO, form the principle varistor powder components, were added to water, organic dispersion agent, defoam agent, and binders are put into a mixer and then milling and spray dried into granulated powders. Then, such granulated powders were filled in a mold to be pressed into discs of diameter 14 mm×thickness 1.2 mm. Subsequently, the pressed discs were heated to remove the binder and then sintered to form the sintered body at a temperature of 1230° C. in a push kiln.

Several trends are illustrated by the data of FIG. 5B. For one, increases in nickel oxide content equivalent to 0.15 molar % Ni from a base composition of 0.7% produces an increase in varistor voltage up to 35.2 V/mm. Similarly, increases in titanium oxide content of several tenths of one percent from a base composition of 0.5 molar % Ti (in oxide form) produces an increase in varistor voltage from 29.9 to 35.7 V/mm. On the other hand, increases in bismuth oxide content from a base composition of 0.9% molar fraction of Bi produces a more complex variation in varistor voltage. Addition of up to 0.75% cause increase in varistor voltage from 29 to 35.8 V/mm, while further increases of up to an additional 1.28% above the 0.9% base composition result in a decrease in varistor voltage to 27.4 V/mm. Finally, increases in antimony oxide content above the base composition of 0.1 molar % Sb for up to 0.16 molar % additional antimony (in oxide form) results in a monotonic decrease in varistor voltage from 41.3 V/mm to 32.6. It is also notable that in some cases surge capacity is substantially affected by the changes in composition of varistor components. In particular, samples were subjected to standard "8/20" waveforms whose results are also shown in FIG. 5B. An 8/20 waveform produces a current surge that reaches a maximum value in 8 μs and decays to 50% of maximum current in 20 μs. Notably, In conventional MOV, the 8/20 us surge current density for 14 mm low voltage varistor ($V_{RMS} \leq 40V$) is about 10~20 A/mm². In present embodiments, in contrast, the 8/20 us surge current density for 14 mm low voltage varistor is enhanced to 58 A/mm².

In another set of experiments multiple different powders were prepared by varying another base powder composition used to form medium voltage "L100" powders.

FIG. 5C and FIG. 5D are a group of L100 formulations having varistor voltages encompassing a range from 100V/mm to about 130V/mm. The compositional data shown in FIGS. 5C and 5D follows the same procedure used for respective FIGS. 5A and 5B discussed above. Thus, the composition of an actual L100 powder material whose electrical measurements are shown in FIG. 5D is determined by L100 formulation=L100 base Composition (L100BC shown in FIG. 5C)+L100 Additional Composition (L100AC shown in FIG. 5D). Again, the L100BC compositions shown in FIG. 5C refers to specified elements in terms of the molar fraction of metals that make up the various starting materials.

In particular, powder compositions were prepared by adjusting the above compositions by increasing the molar percent of the above components, as illustrated in FIGS. 5C and 5D. The above materials, which, in addition to ZnO, form the principle varistor powder components, were added to water, organic dispersion agent, defoam agent, and binders are put into a mixer and then milling and spray dried into granulated powders. Then, such granulated powders were filled in a mold to be pressed into discs of diameter 14 mm×thickness 1.2 mm. Subsequently, the pressed discs were heated to remove the binder and then sintered to form the sintered body at a temperatures of 1230° C. in a push kiln. The pressed discs were then subject to electrical measurements whose results are also shown in FIG. 5D.

Several trends are illustrated by the data of FIG. 5D. For one, increasing nickel oxide content from a 0.40 molar % Ni of a base composition by adding up to 0.73% produces an increase in varistor voltage from about 115 V/mm up to 126 V/mm, while increases in cobalt oxide composition of up to an additional 0.45 molar % Co from the base composition of 0.8 molar % Co produces a similar increase in varistor voltage. Increasing the manganese composition by up to an additional 0.68% over the base composition of 0.2% manganese results in an increase in varistor voltage from about 112 to 131 V/mm, while increasing the aluminum content by up to an additional 0.002% above the base content of 0.002% results in an increase in varistor voltage from 111 V/mm to 125 V/mm. Finally, increasing the bismuth content by up to about 0.4% above the base 2.0% composition did not produce a clear change in varistor voltage. In conventional MOV devices, the 8/20 us surge current density for a 14 mm varistor ($\leq 50V_{RMS} \leq 75V$) is about 35~50 A/mm². In the present embodiments, the 8/20 ms surge current density for 14 mm and same voltage varistor are enhanced to 66 A/mm².

Figure 6A:
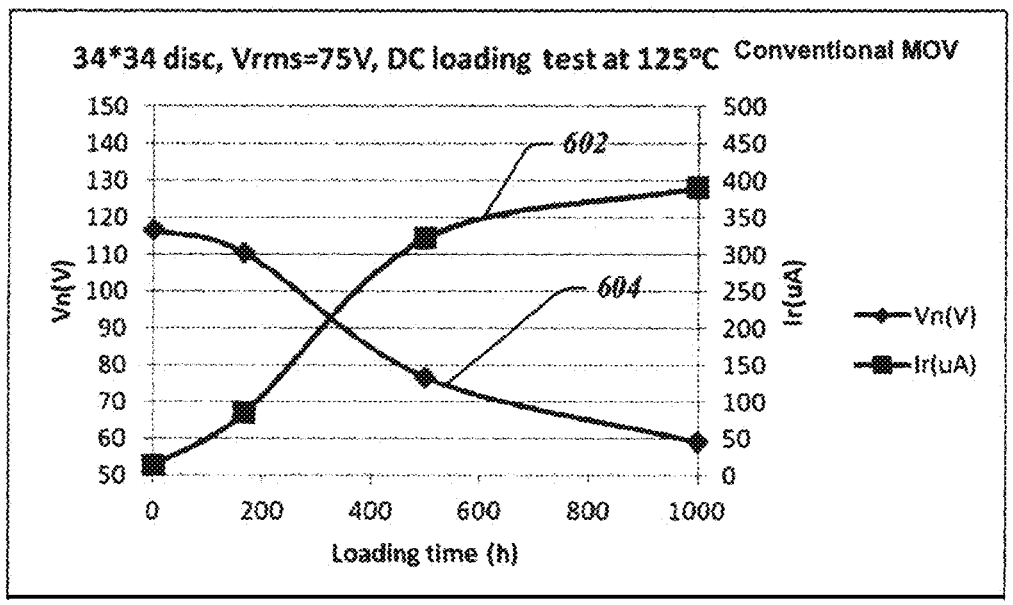
FIG. 6A presents results of measurements of conventional varistor samples.
Figure 6B:
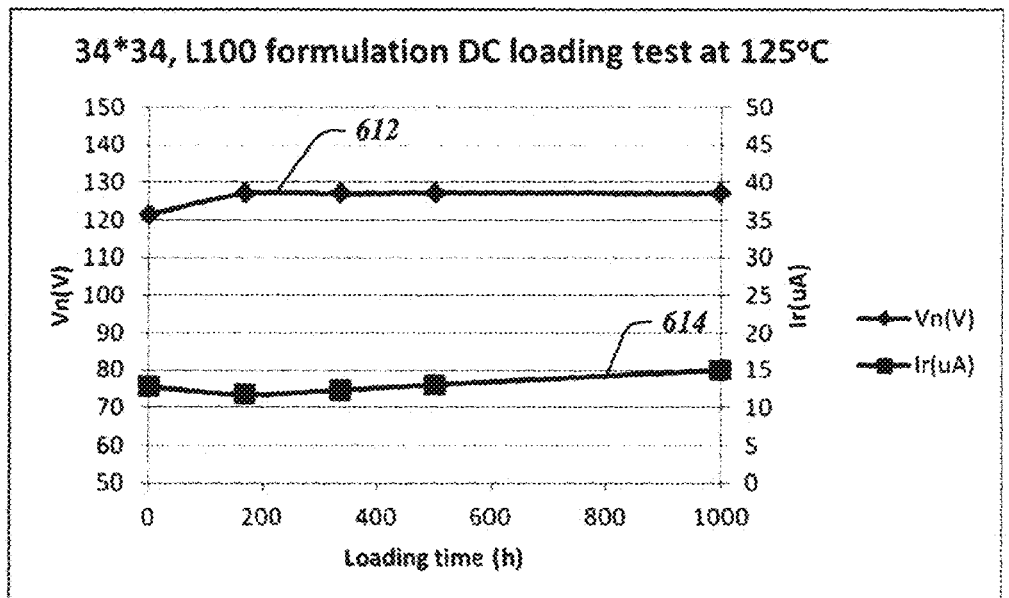
FIG. 6B presents results of measurements of a group of varistor samples fabricated according to the present embodiments.
Figure 6C:
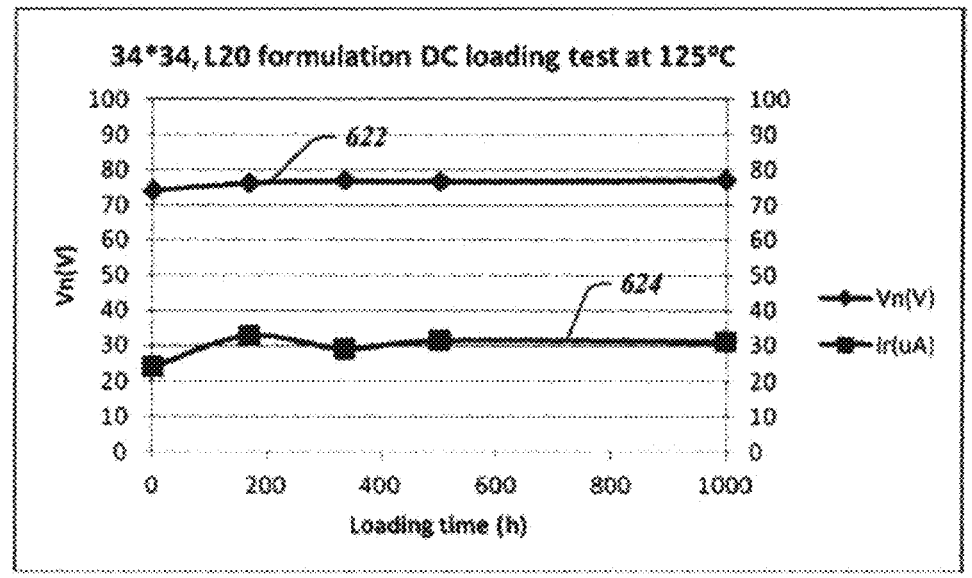
FIG. 6C presents results of measurements of an additional group of varistor samples fabricated according to the present embodiments.

FIGS. 6A to 6C are graphs that present the results of measurements of varistors that further illustrate improvements in performance and reliability afforded by varistors fabricated according to the present embodiments. In FIG. 6A the results of a DC loading test performed on a known ZnO based MOV are presented. In particular, in FIG. 6A, an example of DC loading test results (Vdc=85V, LR=0.728) is shown for a conventional powder where performance is not stable at a high temperature of 125° C. FIGS. 6B and 6C present DC loading test results for two different varistor samples fabricated according to the present embodiments.

MOV samples measured for the results of FIG. 6A were subjected to an applied voltage of 85 V DC at 125° C. The samples (C-MOV) were measured initially, after which they were subject to continuous application of 85 V DC. Measurements were performed after samples were subjected to the DC voltage for durations totaling 168 hr, 500 hr, and 1000 hr. Among the measurement, the parameter Vn was measured and is plotted in the voltage curve 602 shown in FIG. 6A. In particular, Vn values that define the voltage curve 602 were performed at a current of 1 mA. The Vn values shown in FIG. 6A represent the average of several measurements. The C-MOV samples initially exhibit a Vn value of 117 V. However, after 168 hours Vn exhibits a slight decrease to 111 V. At 500 hr, the value of Vn decreases to 77 V, while at 1000 hr the value of Vn drops to 59 V.

The drop in Vn with time that is induced by the applied 85 V DC and illustrated in voltage curve 602 is accompanied by an increase in leakage current as also shown in FIG. 6A. In particular, the leakage current curve 604 plots leakage current (µA) as a function of time. As prepared, the C-MOV samples exhibit a small value of leakage current that averages about 14 µA. At 168 hr, the leakage current increases to about µA, followed by drastic increases to 322 µA and 390 µA at 500 and 1000 hr, respectively. Zero of ten sample measurements were recorded as fails at 168 hr, but at 500 hr and 1000 hr all ten of ten sample measurements were recorded as fails.

FIG. 6B presents results of sample tests similar to those whose results are presented in FIG. 6A. However, the sample measurements reflected in FIG. 6B were performed using a medium voltage varistor composition (L100 formulation) consistent with the present embodiments. The samples measured for the results of FIG. 6B (34*34 square disc, Vrms=75V) were subjected to an applied voltage of 100 V DC (LR=0.822) at 125° C. The samples were measured initially, after which they were subject to continuous application of 100 V DC. Twenty two sample measurements were performed for each test condition after samples were subjected to the DC voltage for durations totaling 168 hr, 336 hr, 500 hr, and 1000 hr. Among the sample measurements, the parameter Vn was measured using 1 mA test current and is plotted in the voltage curve 612 shown in FIG. 6B, which reflects the average of several different sample measurements for each test condition. The L100S samples initially exhibit a Vn value of 122V. However, after 168 hours Vn exhibits a slight increase to 127 V. At 336, 500, and 1000 hr, the value of Vn remains constant at 127 V. Thus, the L100S samples show stable behavior for duration up to at least 1000 hr when subject to 100 V DC voltage. This is also reflected in the results of leakage current measurements shown in the leakage current curve 614. The initial leakage current value is 13 µA, a low value consistent with that of the conventional C-MOV samples. After 168 hr, the measured value decreases to an average of 13 µA, and increases marginally to 15 µA at 1000 hr. No fails were recorded for any of the sample measurements.

FIG. 6C presents results of sample tests similar to those whose results are presented in FIG. 6B using a low voltage varistor composition (denoted herein as L20 formulation) consistent with the present embodiments. The samples measured for the results of FIG. 6C were subjected to an applied voltage of 60 V DC at 125° C. (34*34 square disc, Vrms=45V, LR=0.810).

The samples were measured initially, after which they were subject to continuous application of 60 V DC. Twenty two sample measurements were performed for each test condition after samples were subjected to the DC voltage for durations totaling 168 hr, 500 hr, and 1000 hr.

Among the sample measurements, the parameter Vn was measured using 1 mA test current and is plotted in the voltage curve 622 shown in FIG. 6C, which reflects the average of several different sample measurements for each test condition. The L20 samples initially exhibit a Vn value of 74V. However, after 168 hours Vn exhibits a slight increase to 76 V. At 500 and 1000 hr the value of Vn remains constant at 77 V. Thus, the L20 samples show stable behavior for duration up to at least 1000 hr when subject to 60 V DC voltage. This is also reflected in the results of leakage current measurements shown in the leakage current curve 624. The initial leakage current value is 24 µA, a low value consistent with that of the conventional C-MOV samples. After 168 hr, the measured value increase to an average of 33 µA, and then decrease to 29 µA at 336 hr, then keep 31 µA until to 1000 hr. No fails were recorded for any of 22 sample measurements. It is to be noted that conventionally large dimension low voltage varistors are difficult to withstand DC loading test at a high temperature of 125° C. The dimensions for such low voltage varistors currently range from 5 mm to 20 mm in conventional commercial MOVs. In present embodiments, 34*34 square discs produced with L20 formulation can withstand DC loading test at a high temperature of 125° C.

Additional tests have been performed to the L100 varistor samples fabricated according to the present embodiments to assess the resistance to energy surges. In particular, samples were subjected to standard "8/20" and "10/350" waveforms. An 8/20 waveform produces a current surge that reaches a maximum value in 8 μs and decays to 50% of maximum current in 20 μs, while an 10/350 waveform produces a current surge that reaches a maximum value ($I_{MAX}$) in 10 μs and decays to 50% of maximum current in 350 μs. These waveforms are considered to approximate an indirect lightning strike and direct lightning strike.

Figure 7:
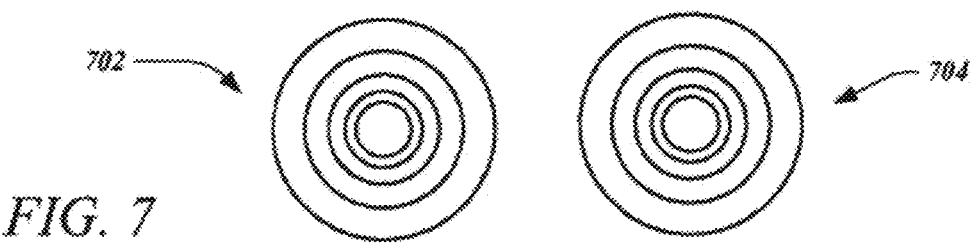
FIG. 7 depicts a comparison of measurements of conventional varistor samples and varistor samples fabricated according to the present embodiments.

In one series of tests low voltage varistors of varying diameter were subjected to 8/20 waveforms to determine maximum current handling capability. FIG. 7 compares results of tests to measure the performance of a set of conventional varistor samples 702 with varistor samples 704 that are fabricated according to an L20 formulation of the present embodiments. Each set of varistor samples 702, 704 included discs of 5, 7, 10, 14, and 20 mm diameter. The table 706 presents results 712 taken from measurements of conventional varistor samples 702 and results 714 based upon varistor samples 704. The parameters $I_{max}$ and $W_{max}$ shown in the table 706 refer to the current and power surge rating based upon the 8/20 waveform testing. As illustrated in table 706, the $I_{max}$ current surge rating is about four to seven times higher for the varistor samples 704 as compared to the varistor samples 702 for a given disc diameter. In addition, the $W_{max}$ values for varistor samples 704 are a factor of about 10 to 20 times higher than their conventional varistor sample 702 counterparts.

Testing using 10/350 waveforms was also performed at a fixed sample size on a series of conventional varistor samples and varistor samples fabricated according to the present embodiments. For conventional varistor samples, the maximum pulse current was varied between about 3.1 kA and 5 kA. Samples subjected to current above about 3.3 kA were not reliable and generally failed, leading to a rating of about 3200 A single pulse surge protection capability for the 10/350 waveform. Varistor samples fabricated according to the present embodiments were subjected to pulse current ranging from 650 A to 6.5 kA. All of such samples remained stable under pulses up to 6.5 kA.

FIG. 8 depicts experimental measurements 802 of the electrical performance of high voltage varistors synthesized according to the L150 formulation. FIG. 8 also depicts experimental measurements 804 of the electrical performance of varistors synthesized using the intermediate voltage L100 formulation. Finally, FIG. 8 also depicts experimental measurements 806 of the electrical performance of varistors synthesized using the low voltage L20 formulation. As illustrated in FIG. 8, the high voltage varistor material 802 has a Vc of about 1400 V for a 34 mm×34 mm varistor, while the low voltage varistor material 806 has a Vc of about 580 V for a 34 mm×34 mm varistor. The $V_{10kA}/V_{1mA}$ ratio increases from about 2.8 for the high voltage material 802 to about 8.9 for the low voltage material 806.

In sum, novel formulations for ZnO based varistors are disclosed. In particular, preparing a novel combination of composition of metal oxides and additives to the overall zinc oxide material has been found to greatly enhance performance and reliability in ZnO based varistors.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A varistor ceramic comprising:
   zinc oxide having a molar percent greater than 90 percent;
   a set of metal oxides, the set of metal oxides comprising:
      bismuth in oxide form comprising a molar fraction equivalent to between 0.2 and 2.5 percent $Bi_2O_3$;
      cobalt in oxide form comprising a molar fraction equivalent to between 0.2 and 2.0 percent $Co_3O_4$;
      manganese in oxide form comprising a molar fraction equivalent to between 0.05 and 1.5 percent $Mn_3O_4$;
      chromium in oxide form comprising a molar fraction equivalent to between 0.05 and 0.5 percent $Cr_2O_3$;
      nickel in oxide form comprising a molar fraction equivalent to between 0.5 and 1.5 percent NiO;
      antimony in oxide form comprising a molar fraction equivalent to between 0.05 and 0.199 percent $Sb_2O_3$;
      boron in oxide form comprising a having a molar fraction equivalent to 0.001 to 0.05 percent $B_2O_3$; and
   aluminum in oxide form comprising a molar fraction equivalent to between 0.001 and 0.05 percent.

2. The varistor of claim 1, comprising:
   bismuth in oxide form comprising a molar fraction equivalent to between 0.8 and 1.0 percent $Bi_2O_3$;
   cobalt in oxide form comprising a molar fraction equivalent to between 0.4 and 0.6 percent $Co_3O_4$;
   manganese in oxide form comprising a molar fraction equivalent to between 0.05 and 0.2 percent $Mn_3O_4$;
   chromium in oxide form comprising a molar fraction equivalent to between 0.1 and 0.2 percent $Cr_2O_3$;
   nickel in oxide form comprising a molar fraction equivalent to between 0.6 and 0.8 percent NiO;
   antimony in oxide form comprising a molar fraction equivalent to between 0.05 and 0.15 percent $Sb_2O_3$; and
   titanium in oxide form comprising a molar fraction equivalent to between 0.5 and 0.7 percent $TiO_2$.

3. The varistor of claim 1, comprising:
   bismuth in oxide form comprising a molar fraction equivalent to between 2 and 2.2 percent $Bi_2O_3$;
   cobalt in oxide form comprising a molar fraction equivalent to between 0.3 and 0.5 percent $Co_3O_4$;
   manganese in oxide form comprising a molar fraction equivalent to between 0.1 and 0.3 percent $Mn_3O_4$;
   chromium in oxide form comprising a molar fraction equivalent to between 0.05 and 0.2 percent $Cr_2O_3$;
   nickel in oxide form comprising a molar fraction equivalent to between 0.7 and 0.9 percent NiO.

4. The varistor of claim 1, comprising:
   bismuth in oxide form comprising a molar fraction equivalent to between 0.4 and 0.6 percent $Bi_2O_3$;
   cobalt in oxide form comprising a molar fraction equivalent to between 0.3 and 0.4 percent $Co_3O_4$;
   manganese in oxide form comprising a molar fraction equivalent to between 0.2 and 0.4 percent $Mn_3O_4$;
   chromium in oxide form comprising a molar fraction equivalent to between 0.05 and 0.2 percent $Cr_2O_3$; and
   nickel in oxide form comprising a molar fraction equivalent to between 1.0 and 1.2 percent NiO.

5. The varistor of claim 1, further comprising at least one alkaline earth metal having a molar percent of 0.001 to 0.03.

6. A method of fabricating a varistor ceramic comprising:
forming a varistor slurry comprising:
- a solvent mixture;
- a set of additives including an aluminum containing species operative to produce a molar fraction of aluminum in the varistor ceramic of 0.001 to 0.1 percent;
- a set of metal oxides comprising:
  - bismuth in oxide form comprising a molar fraction equivalent to between 0.2 and 2.5 percent $Bi_2O_3$;
  - cobalt in oxide form comprising a molar fraction equivalent to between 0.2 and 1.2 percent $Co_3O_4$;
  - manganese in oxide form comprising a molar fraction equivalent to between 0.05 and 0.5 percent $Mn_3O_4$;
  - chromium in oxide form comprising a molar fraction equivalent to between 0.05 and 0.5 percent $Cr_2O_3$;
  - nickel in oxide form comprising a molar fraction equivalent to between 0.5 and 1.5 percent NiO;
  - antimony in oxide form comprising a molar fraction equivalent to between 0.05 and 0.199 percent $Sb_2O_3$; and
  - zinc oxide operative to generate a molar fraction greater than 95 percent in the varistor ceramic; and
heat treating the varistor slurry to form a solid varistor granule.

7. The method of claim 6, wherein the forming the varistor slurry further comprising:
preparing a binder solution containing a polymeric material;
dissolving the binder solution in a set of solvent components to form the solvent mixture before forming the varistor slurry; and
spray drying the varistor slurry wherein a powder is formed from the varistor slurry.

8. The method of claim 7, further comprising:
forming varistor powder from the varistor slurry;
pressing the varistor powder to form a varistor perform; and
heat treating the varistor powder through at a temperature in the range of 400° C. to 700° C. for a duration effective to remove polymeric material.

9. The method of claim 6, wherein the heat treating the varistor slurry comprising:
performing a debinder heat treatment on a compacted varistor powder formed from the varistor slurry at a debinder temperature in the range of 500° C. to 600° C.;
sintering the heat treated compacted varistor powder at a maximum sintering temperature between 1000° C. and 1300° C.; and
performing a silver firing at a temperature range of about 500° C. to 700° C.

10. The method of claim 9, wherein the debinder heat treatment comprising a duration of about 15 to 40 hr.

11. The method of claim 9, wherein the sintering comprising a duration of about 18 to 25 hrs.

12. The method of claim 9, wherein the silver firing comprising a duration of about 30 to 200 minutes.

* * * * *